United States Patent
Yamaguchi et al.

[11] Patent Number: 5,913,085
[45] Date of Patent: Jun. 15, 1999

[54] ELECTRONIC FLASH AND A CAMERA PROVIDED WITH THE SAME

[75] Inventors: Takehisa Yamaguchi, Ikoma; Satoshi Yokota, Toyonaka; Hideki Takewa, Sakai, all of Japan

[73] Assignee: Minolta Co., Ltd., Osaka, Japan

[21] Appl. No.: 08/864,889

[22] Filed: May 29, 1997

[30] Foreign Application Priority Data

May 29, 1996 [JP] Japan ................................ 8-135223

[51] Int. Cl.$^6$ .......................... G03B 15/05; G03B 17/18
[52] U.S. Cl. .................................. 396/205; 396/301
[58] Field of Search ................................ 396/201, 202, 396/203, 205, 206; 315/241 P, 301

[56] References Cited

U.S. PATENT DOCUMENTS 4,751,545  6/1988  Iguchi ....................................... 396/205
5,194,889  3/1993  Ogawa ...................................... 396/205

FOREIGN PATENT DOCUMENTS 01314230  12/1989  Japan .
02093442  4/1990  Japan .

*Primary Examiner*—Russell Adams
*Assistant Examiner*—Michael Dalakis
*Attorney, Agent, or Firm*—Burns, Doane, Swecker & Mathis, L.L.P.

[57] ABSTRACT

An electronic flash is provided with a detector for detecting a voltage of a power source when a charging of a capacitor is started, a timer for measuring an elapsed time from the start of the charging, a memory for storing a relationship between control times and voltages of the power source, and a controller for setting a control time based on a detected voltage and the stored relationship, and controlling stop of the charging in accordance with the set control time and measurement of the timer. This can prevent excessive charging without unnecessarily making the capacitor larger.

20 Claims, 10 Drawing Sheets

ELECTRONIC FLASH AND A CAMERA PROVIDED WITH THE SAME

BACKGROUND OF THE INVENTION

This invention relates to an electronic flash and a camera provided with an electronic flash.

In recent years, there has been a tendency to make the main body of a compact camera provided with an electronic flash smaller and more compact. Accordingly, a charging device of the flash has been forced to have a smaller main capacitor for storing an energy to be emitted from the flash. Further, in order to speed up a photography preparation in flash photographing, it is required to charge the main capacitor at a higher speed.

In order to meet the above requirements, in the charging device of the known electronic flash, the main capacitor is made smaller by reducing a withstand voltage as much as possible and charging is performed at a high speed by accurately detecting a charge voltage of the main capacitor and accurately controlling a charge stop timing based on this charge voltage. More specifically, the lower the withstand voltage, the smaller the main capacitor can be made. Accordingly, by making a margin for the charge voltage as small as possible to reduce the withstand voltage of the main capacitor, the main capacitor is made smaller. Further, the high speed charging of the main capacitor is performed by increasing a wind number ratio (wind number of secondary coil/wind number of primary coil) of a step-up transformer of the charging device to perform the charging at as large a charge current as possible while accurately controlling the charge stop timing.

Further, in the charging device of the prior art flash, the excessive charging of the main capacitor and the abnormal generation of heat within the charging device need to be prevented in the case that a charge stop control becomes impossible due to a certain abnormality. Accordingly, if charging is continued for longer than a specified time, a safety measure is taken to forcibly stop the charging operation upon the judgment of a charging abnormality.

A charging time differs depending upon a variety of conditions such as a battery voltage, a residual voltage of the main capacitor and an ambient temperature and is not constant in every charging operation. Thus, a time by which the main capacitor is excessively charged and an amount of heat generated within the charging device in an abnormal manner when an abnormality occurs differ.

However, in the charging device of the prior art flash, the charging operation is not forcibly stopped unless the time fixedly set in advance for the protection against excessive charging elapses. Therefore, in some cases, the main capacitor may be damaged by excessive charging before this control for the protection from against charging starts, and/or the heat abnormally generated within the charging device may exceed a limit value, with the result that the protection function may not effectively operate.

SUMMARY OF THE INVENTION

It is an object of the present invention to provide an electronic flash which has overcome the problems residing in the prior art.

It is another object of the present invention to provide a camera provided with an electronic flash which has overcome the problems residing in the prior art.

According to an aspect of the present invention, a device comprises: a booster which boosts the voltage of an electric energy from a power source; a capacitor which stores the boosted electric energy; a light emitter which emits flash light by use of the stored electric energy; a detector which detects a voltage of the power source when a charging of the capacitor is started; a timer which measures an elapsed time from the start of the charging; a memory which stores a relationship between control times and voltages of the power source; and a controller which sets a control time based on a detected voltage and the stored relationship, and controls stop of the charging in accordance with the set control time and measurement of the timer.

According to another aspect of the present invention, a device comprises: a booster which boosts the voltage of an electric energy from a power source; a capacitor which stores the boosted electric energy; a light emitter which emits flash light by use of the stored electric energy; a detector which detects a voltage of the power source when a charging of the capacitor is started; a timer which measures an elapsed time from the start of the charging; a calculator which calculates a control time based on a detected voltage; and a controller which controls stop of the charging in accordance with the calculated control time and measurement of the timer.

According to still another aspect of the present invention, a device comprises: a booster which boosts the voltage of an electric energy from a power source; a capacitor which stores the boosted electric energy; a light emitter which emits flash light by use of the stored electric energy; a capacitor voltage detector which detects a voltage of the capacitor when a charging of the capacitor is started; a timer which measures an elapsed time from the start of the charging; a calculator which calculates a control time based on a detected capacitor voltage; and a controller which controls stop of the charging in accordance with the calculated control time and measurement of the timer.

According to yet still another aspect of the present invention, a device comprises: a booster which boosts the voltage of an electric energy from a power source; a capacitor which stores the boosted electric energy; a light emitter which emits flash light by use of the stored electric energy; a time measurer which measures a charging time from start of a specified charging to complete of the specified charging; a memory which stores a measured charging time; a timer which measures an elapsed time from the start of a charging; and a controller which controls stop of a charging following the specified charging in accordance with the stored charging time and measurement of the timer.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
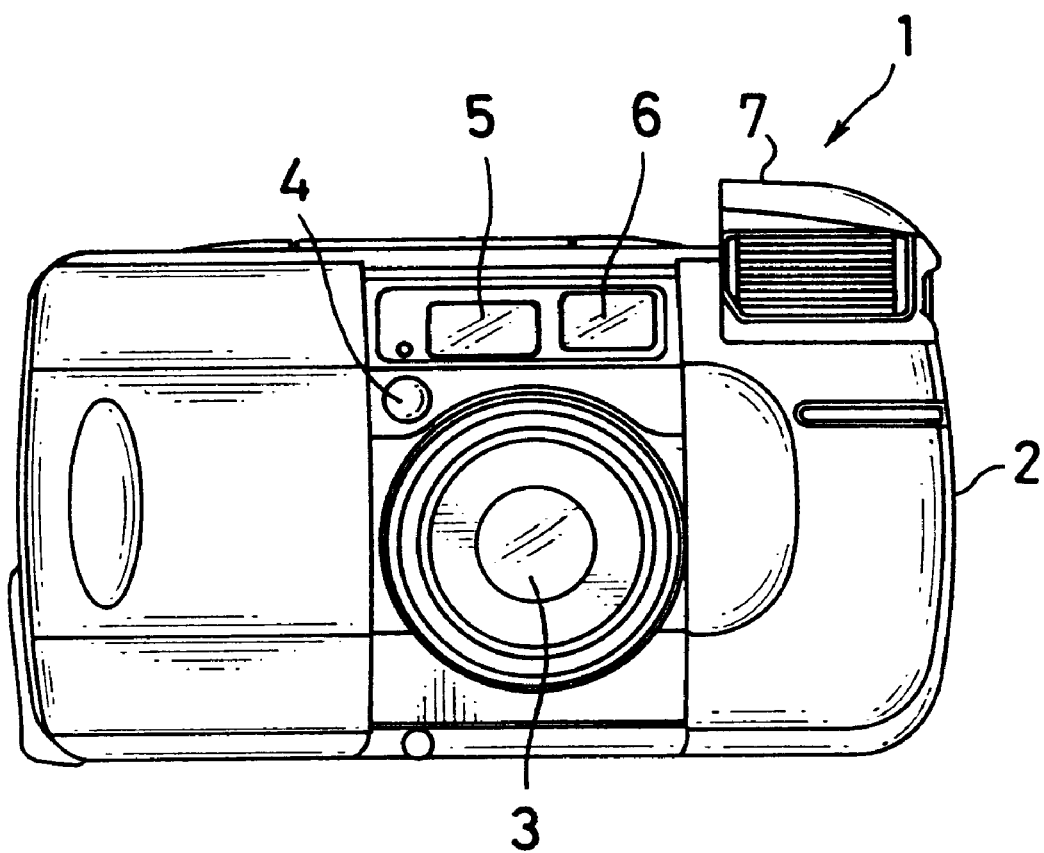
FIG. 1 is a front view showing an outer configuration of a camera provided with an electronic flash according to the invention.

FIG. 1 shows one embodiment of the present invention, and is a front view showing an outer configuration of a camera of the embodiment.

A camera 1 is provided with a taking lens 3 including a lens shutter substantially in the center of the front surface of a camera main body 2, and a light meter 4 disposed obliquely upward from the taking lens 3 to the left. Further, a distance meter 5 is disposed above the taking lens 3, and an objective window 6 of a viewfinder is disposed on the left side of the distance meter 5. A pop-up type electronic flash 7 is provided at an upper right end corner of the camera main body 2.

The light meter 4 includes light receiving elements such as silicon photo cells (SPCs) and is adapted to receive a light reflected by an object and to perform a light measurement by averaging a brightness within an entire view. The distance meter 5 includes a distance metering area in the center of the view and is adapted to detect a distance to the object (hereinafter, "object distance") based on an image information obtained by receiving the light reflected by the object whose image falls within the distance metering area. The distance meter 5 also includes a pair of line image sensors such as CCD line sensors. A partial light image of the object is received by the line image sensors, and the object distance is detected using data constituting both light images received by the line sensors (data outputted from the respective pixels).

Figure 2:
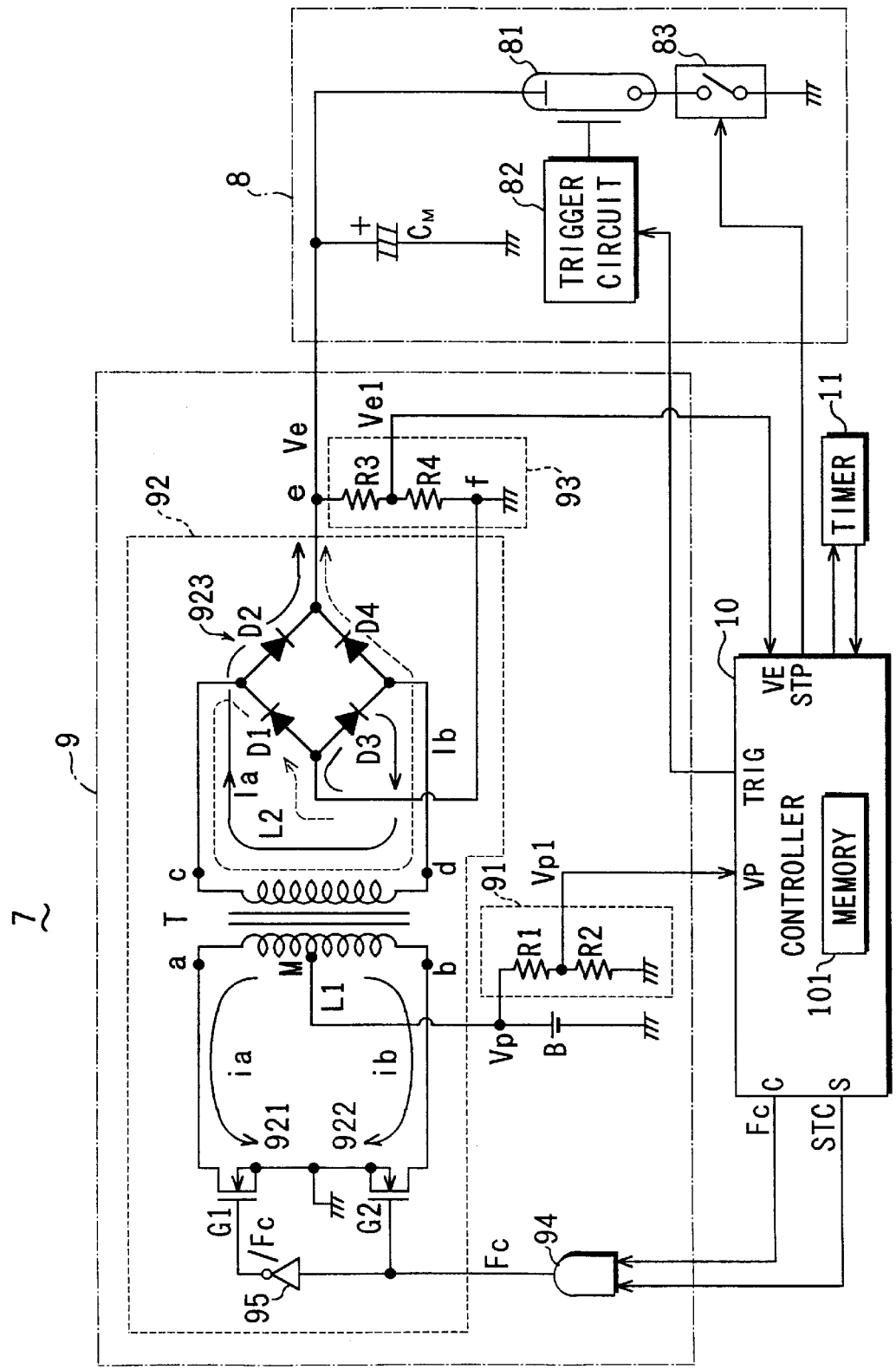
FIG. 2 is a diagram showing a circuit construction of a first electronic flash provided in the camera.

FIG. 2 is a circuit construction diagram of the electronic flash 7 which is provided in the camera 1.

The electronic flash 7 is provided with a flash firing circuit 8 for firing the flash 7, a charging circuit 9 for charging a main capacitor $C_M$ provided in the flash firing circuit 8 for storing an energy to be emitted, a controller 10 for controlling the drive of the charging circuit 9 and the flash firing circuit 8, and a timer 11 for measuring a protection time Ts to be described later.

The flash firing circuit 8 includes the main capacitor $C_M$, a xenon (Xe) discharge tube 81, a trigger circuit 82 and a switch circuit 83. The Xe discharge tube 81 discharges the electric charges stored in the main capacitor $C_M$ to fire the flash 7. The trigger circuit 82 converts a trigger signal (signal instructing the flash firing) outputted from a TRIG terminal of the controller 10 into a high voltage trigger signal and outputs it to the Xe discharge tube 81. The switch circuit 83 is a switch for forcibly stopping the flash firing. The switch circuit 83 is normally in such a state as to close the circuitry (in its ON-state), and interrupts the flash firing by momentarily cutting off a discharge path of the Xe discharge tube 81 in accordance with a firing stop signal outputted from a STP terminal of the controller 10.

The charging circuit 9 includes a battery B for supplying the emission energy to the main capacitor $C_M$, a first voltage detecting circuit 91 for detecting a voltage Vp of the battery B, a DC/DC converter 92 for boosting the voltage Vp of the battery B to a specified charge voltage Ve, and a second voltage detecting circuit 93 for detecting a terminal voltage Ve of the main capacitor $C_M$.

Since the electronic flash 7 is provided in the camera 1, a power battery of the camera 1 is used also as the battery B. Further, the controller 10 may be constructed by a microcomputer for centrally controlling the photographing operation of the camera 1.

The first voltage detecting circuit 91 is a series circuit including resistors R1 and R2 connected in series with the battery B, and detects the voltage Vp of the battery B by dividing it into a voltage $Vp1=Vp \cdot R2/(R1+R2)$. The second voltage detecting circuit 93 is a series circuit including resistors R3 and R4 connected in series with the main capacitor $C_M$, and detects the voltage Ve of the main capacitor $C_M$ by dividing it into a voltage $Ve1=Ve \cdot R4/(R3+R4)$. The detected voltage Vp1 is inputted to a VP terminal of the controller 10, whereas the detected voltage Ve1 is inputted to a VE terminal of the controller 10. An analog-to-digital (A/D) converter is provided in the VP and VE terminals of the controller 10, so that the detected voltages Vp1, Ve1 are taken into the controller 10 after being converted into digital signals.

The DC/DC converter 92 includes a step-up transformer T for boosting the voltage Vp of the battery B, two switching devices 921, 922 each constructed by an FET (field-effect transistor) of MOS (metal oxide semiconductor) type for interrupting the voltage Vp applied to a primary coil L1 of the step-up transformer T (hereinafter, "primary voltage Vp"), and a diode bridging circuit 923 including, for example, four diodes D1 to D4 for applying a full wave rectification to an alternating current produced by a voltage Vq induced in a secondary coil L2 of the step-up transformer T (hereinafter, "secondary voltage Vq"). The switching devices 921, 922 are not limited to FETs of MOS type, but may be an other type of semiconductor switching device such as a junction FET or a silicon transistor.

The battery B is connected with an intermediate tap M of the primary coil L1 of the step-up transformer T and a primary ground. The switching device 921 (hereinafter, "FET 921") is connected with one terminal a of the step-up transformer T and the primary ground, whereas the switching device 922 (hereinafter, "FET 922") is connected with the other terminal b of the step-up transformer T and the primary ground. Two gates G1, G2 of the FETs 921, 922 are inputted drive control signals /Fc, Fc, whose phases are shifted by 180° to each other, via an AND circuit 94.

The drive control signal Fc is a pulse train signal of specified frequency f (Hz) outputted from the controller 10, and the drive control signal /Fc is obtained by inverting the above pulse train signal by an inverter 95.

The AND circuit 94 forms a protection circuit for preventing the abnormal generation of heat of the DC/DC converter 92 and the excessive charging of the main capacitor $C_M$ upon occurrence of an abnormality. To the AND circuit 94 are inputted the drive control signal Fc and a charge stop signal STC for instructing a forcible stop of the charging operation.

The charge stop signal STC is a signal for instructing a charge stop by changing its level from high to low and acts, in the AND circuit 94, as a gate signal for the drive control signal Fc. Accordingly, when the charge stop signal STC is at high level (the gate is open), the drive control signal Fc from the controller 10 is outputted as it is. When the charge stop signal is at low level (the gate is closed), the drive control signal Fc is not outputted from the AND circuit 94.

The charge stop signal STC is at high level at the start of charging. Upon the elapse of a predetermined protection time Ts after the start of charging, the charge stop signal STC is inverted to low level. On the other hand, the drive control signal Fc is outputted from the controller 10 at a charge start timing, and the output thereof is stopped at a charge completion timing set in accordance with a detection value of the voltage Ve of the main capacitor $C_M$.

Since the protection time Ts is set longer than a maximum value of a time Tg during which the drive control signal Fc is outputted (i.e., charging time Tg), the drive control signal Fc is outputted from the AND circuit 94 only during the charging time Tg in a normal operational state. However, if the charging time Tg exceeds the protection time Ts upon occurrence of a certain abnormality, the charge stop signal STC is inverted to low level upon the elapse of the protection time Ts, thereby stopping the input of the drive control signal Fc to the DC/DC converter 92. Accordingly, the DC/DC converter 92 is forcibly stopped at an inversion timing of the charge stop signal STC, with the result that the excessive charging of the main capacitor $C_M$ for longer than the protection time Ts and the abnormal generation of heat in the DC/DC converter 92 can be prevented.

The FET 921 is on while the drive control signal /Fc is at high level, thereby connecting the terminal a of the primary coil L1 with the primary ground, whereas it is off while the drive control signal /Fc is at low level, thereby interrupting the connection of the terminal a of the primary coil L1 with the primary ground. Likewise, the FET 922 is on while the drive control signal Fc is at high level, thereby connecting the terminal b of the primary coil L1 with the primary ground, whereas it is off while the drive control signal Fc is at low level, thereby interrupting the connection of the terminal b of the primary coil L1 with the primary ground. Accordingly, a primary current ia intermittently flows between the terminal a of the primary coil L1 and the primary ground only while the drive control signal /Fc is at high level. A primary current ib intermittently flows between the terminal b of the primary coil L1 and the primary ground only while the drive control signal Fc is at high level. A high voltage is induced in the secondary coil L2 by these intermittent primary currents ia, ib.

The controller 10 controls the charging of the main capacitor $C_M$ by controlling the drive of the DC/DC converter 92. The controller 10 is provided with a memory 101 for storing a specified protection Ts set in advance in connection with the battery voltage Vp. Further, the timer 11 is connected with the controller 10.

Figure 3:
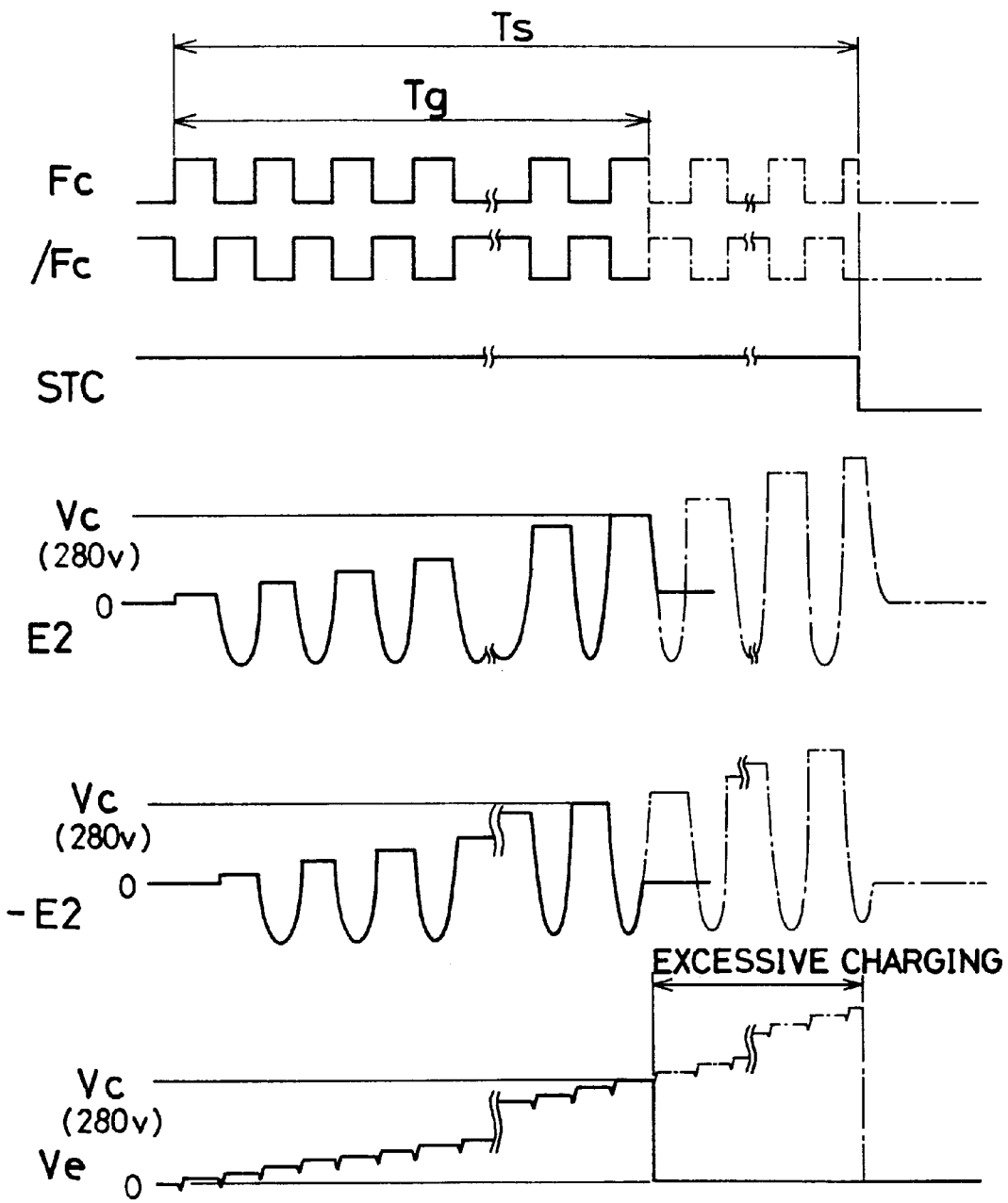
FIG. 3 is a chart showing waveforms of respective parts of a DC/DC converter during a charging operation.

FIG. 3 is a chart showing waveforms of the respective parts of the DC/DC converter 92 during the charging operation.

Upon an instruction of flash charging, the controller 10 generates the drive control signal Fc including a pulse train signal of predetermined frequency having a duty ratio of 50%, and outputs it through a C terminal while outputting the charge stop signal STC of high level through an S terminal. The drive control signal Fc is inputted to the gate G2 of the FET 922 as it is via the AND circuit 94, and is also inputted to the gate G1 of the FET 921 after having its phase inverted by the inverter 95. The FETs 921, 922 are alternately on-off driven by the drive control signals Fc, /Fc. The duty ratio of the drive control signals Fc, /Fc is not limited to 50%, but may be set at a suitable value.

While the FET 921 is on, the FET 922 is off; the terminal a of the primary coil L1 of the step-up transformer T is grounded; and the terminal b thereof is released. Accordingly, the primary current ia flows from the intermediate tap M toward the terminal a, and a secondary voltage +E2 (>E1) is induced in the secondary coil L2, causing a current to flow from point d to point c. This secondary voltage +E2 turns the diodes D2, D3 on, with the result that a secondary current Ia in the direction of point d to point c flows into the main capacitor $C_M$.

On the other hand, while the FET 921 is off, the FET 922 is on; the terminal a of the primary coil L1 of the step-up transformer T is released; and the terminal b thereof is grounded. Accordingly, the primary current ib flows from the intermediate tap M toward the other terminal b, and a secondary voltage –E2 is induced in the secondary coil L2, causing a current to flow from point c to point d. This secondary voltage –E2 turns the diodes D1, D4 on, with the result that a secondary current Ib in the direction of point c to point d flows into the main capacitor $C_M$.

Accordingly, by alternately on-off driving the FETs 921, 922, the secondary voltage ±E2 is alternately induced at the opposite ends c, d of the secondary coil L2 of the step-up transformer T. The secondary currents Ia, Ib generated by the secondary voltage ±E2 are alternately supplied to the main capacitor $C_M$ after being subjected to a full-wave rectification in the diode bridging circuit 923. Electric charges are stored in the main capacitor $C_M$ by the supply of the secondary currents Ia, Ib, gradually increasing the voltage Ve of the main capacitor $C_M$ as shown in FIG. 3.

The voltage Ve is detected by being converted into a divided voltage Ve1 by the second voltage detecting circuit 93. When the voltage Ve increases to a predetermined voltage Vc (upon the elapse of the charging time Tg in FIG. 3), the controller 10 stops the output of the drive control signal Fc upon the judgment that the charging has been completed, thus completing the charging control.

On the other hand, in the case that the charge stop timing cannot be accurately detected when an abnormality occurs in the electronic flash 7, the drive control signal Fc continues to be outputted despite the fact that the charging of the main capacitor $C_M$ has been completed, i.e., the charging of the main capacitor $C_M$ is continued (excessive charging) as indicated by phantom line in FIG. 3. However, upon the elapse of the predetermined protection time Ts after the start of charging, the charge stop signal STC is inverted from high level to low level, thereby forcibly stopping the output of the drive control signal Fc to the DC/DC converter 92 to stop excessive charging. The protection time Ts is set at a specified time in accordance with the voltage Ve of the main capacitor $C_M$ at the start of charging, such that an excessive charging time (Ts-Tg) does not exceed a permissible time. Therefore, even upon the occurrence of an abnormality, the electronic flash 7 is properly and securely protected against excessive charging.

Figure 4:
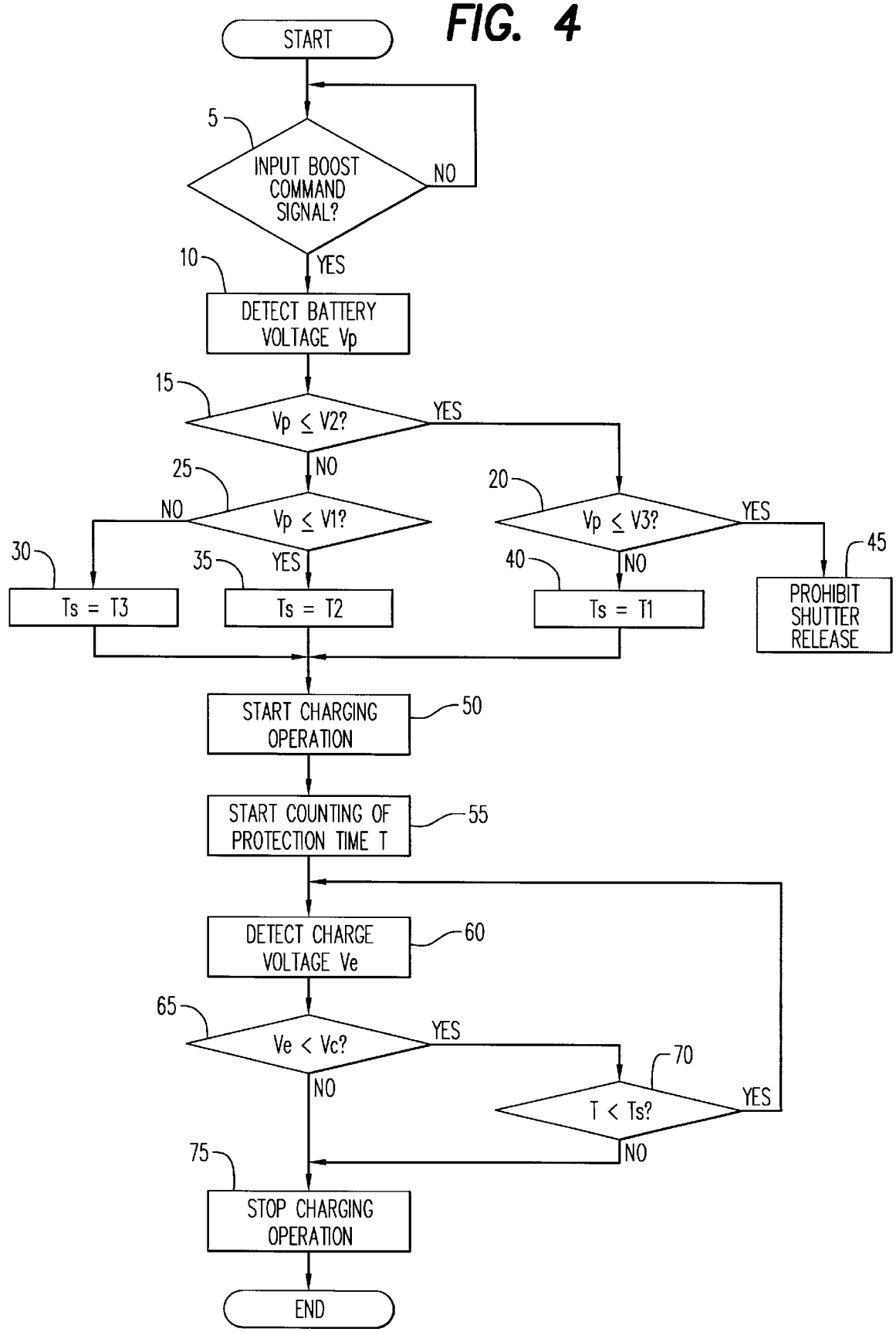
FIG. 4 is a flowchart showing a first charging control of a main capacitor $C_M$ of the first electronic flash.
Figure 5:
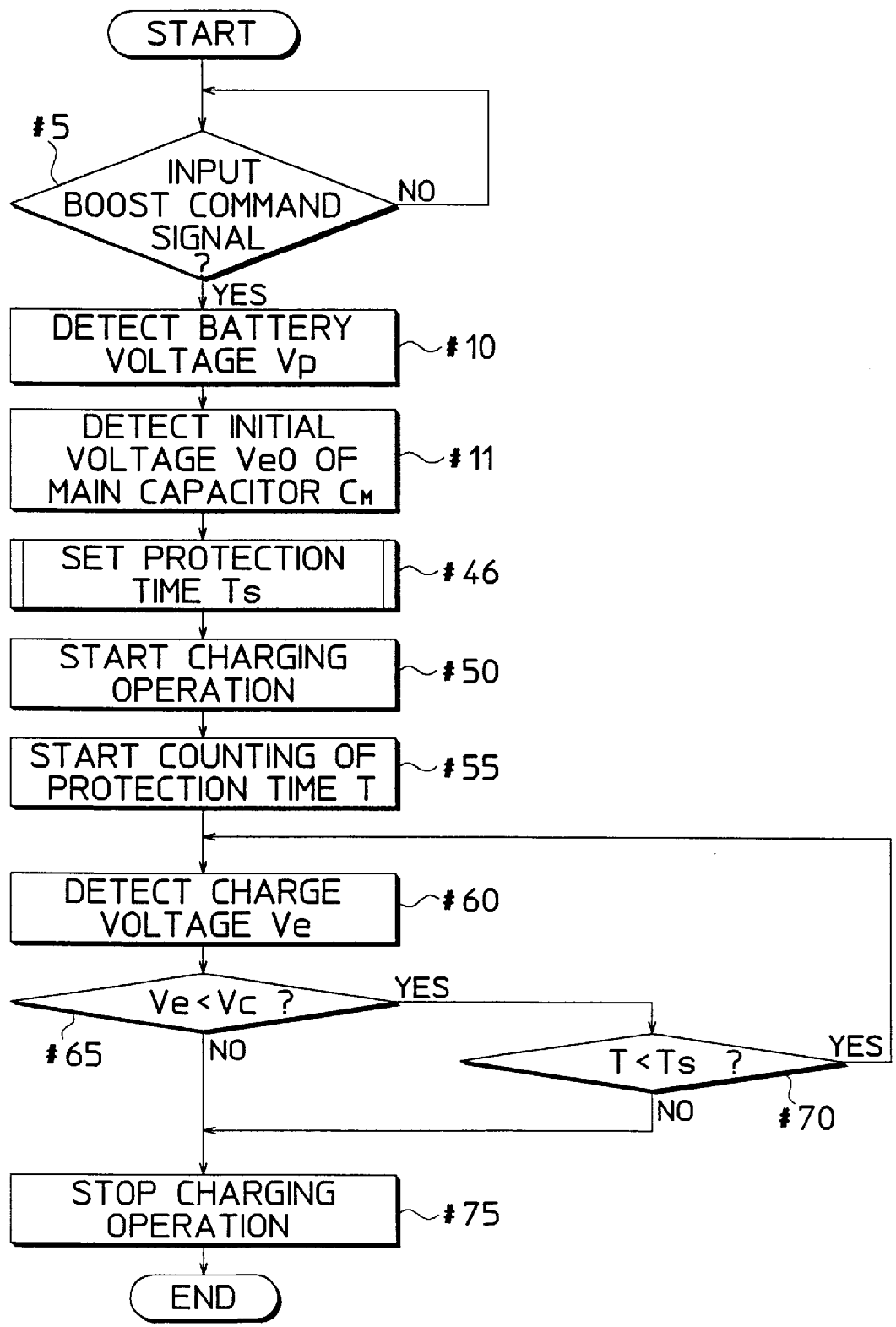
FIG. 5 is a flowchart showing a second charging control of the main capacitor $C_M$ of the first electronic flash.
Figure 6:
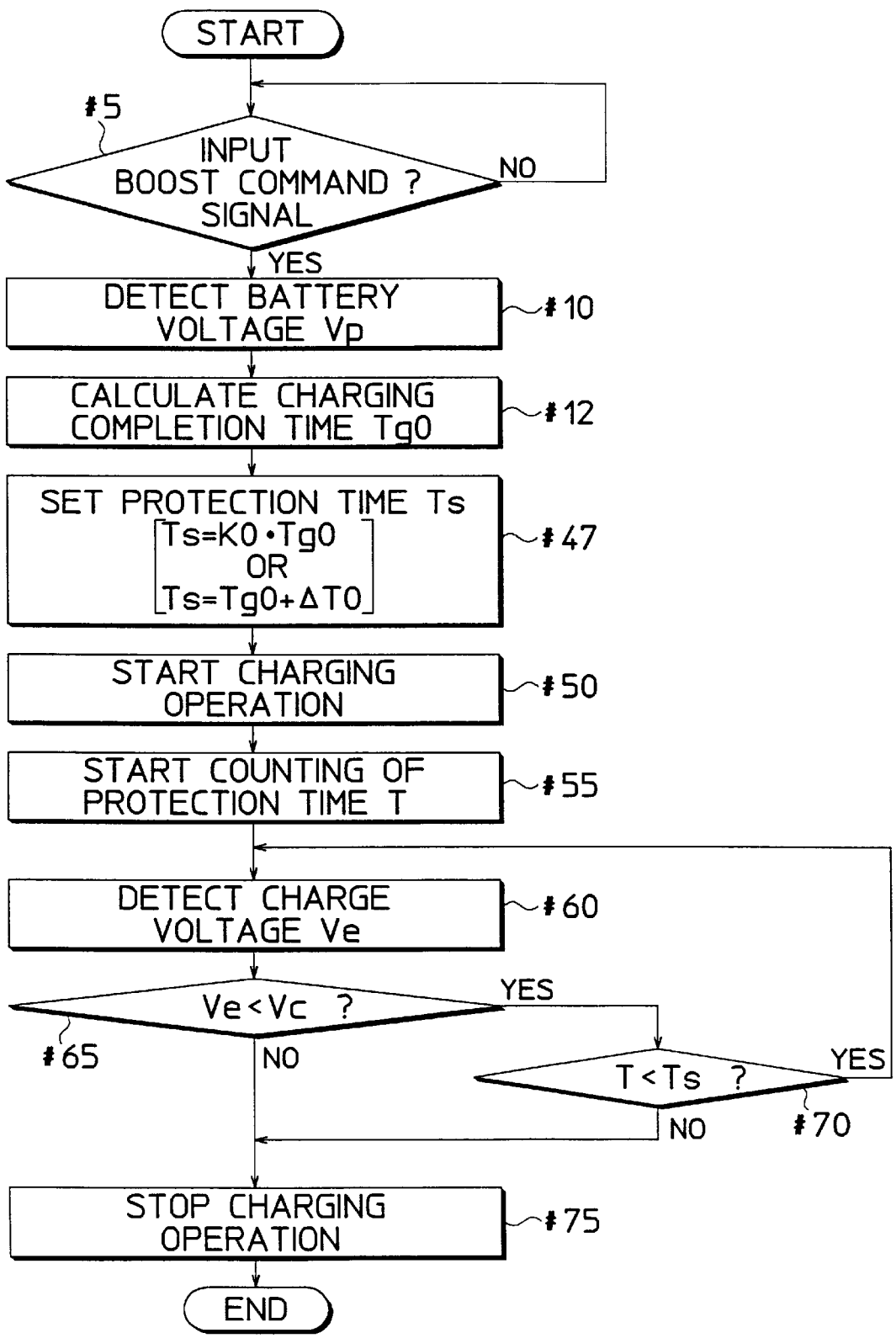
FIG. 6 is a flowchart showing a third charging control of the main capacitor $C_M$ of the first electronic flash.

Next, the charging control of the controller 10 is described in accordance with flowcharts shown in FIGS. 4 to 6.

FIG. 4 is a flowchart showing a first charging control of the main capacitor $C_M$ of the electronic flash 7 according to the electronic flash 7. The first charging control is designed to change the protection time Ts according to the battery voltage Vp.

When a flash photographing is required based on the brightness of the object or in response to a forcible flash firing instruction, a boost command signal is inputted, e.g., from a controller 10 or a separate microcomputer for centrally controlling the photographing operation of the camera 1 (YES in Step #5). Then, the battery voltage Vp is first detected by the first voltage detecting circuit 91 (Step #10).

Subsequently, the detected battery voltage Vp is compared with three threshold values V1, V2, V3 (V3<V2<V1) set in advance (Steps #15 to #25), and the protection time Ts corresponding to the level of the battery voltage Vp is set in the timer 11 (Step #30 to #45).

More specifically, if V1<Vp (NO in Steps #15 and #25), a shortest time T3 is set as the protection time Ts in the timer 11 (Step #30). If V2<Vp≦V1 (NO in Step #15, YES in Step #25), a second shortest time T2 is set as the protection time Ts in the timer 11 (Step #35). If V3<Vp≦V2 (YES in Step #25, NO in Step #20), a longest time T1 is set as the protection time Ts in the timer 11 (Step #40). If Vp≦V3 (YES in Steps #15 and #20), a processing for prohibiting a shutter release is performed upon the judgment that the battery B has been consumed to the extent that the photographing operation cannot be properly performed any longer (the battery B needs to be replaced) (Step #45).

The protection times T1 to T3 are stored in the memory 101. The controller 10 reads the protection time Ts corresponding to the level of the detected voltage Vp from the memory 101 and sets it in the timer 11. For example, in the electronic flash 7 of the camera 1 having a power battery of 6 V, the protection time Ts is set as defined in TABLE-1 below based on the level of the battery voltage Vp. The higher the battery voltage Vp, the shorter the set protection time Ts. This is because the higher the battery voltage Vp, the newer the battery B, and accordingly the main capacitor $C_M$ can be charged at high speed (i.e., the charging time can be shortened). A variation of the excessive charging time (Ts-Tg) caused by a change of the battery voltage Vp is suppressed and the heat load of the DC/DC converter 92 and the burden on the main capacitor $C_M$ are made as uniform as possible.

TABLE 1

| Vp (V) | Ts (sec) |
|---|---|
| VP ≦ 4.4 | * |
| 4.4 < Vp ≦ 5.0 | 12 |
| 5.0 < Vp ≦ 6.0 | 5 |
| 6.0 < Vp | 3 |

Note)
*denotes that a shutter release is prohibited.

When the setting of the protection time Ts is completed, charging is started (Step #50). In other words, the controller 10 outputs the drive control signal Fc and the charge stop signal STC of high level to start driving the DC/DC converter 92. Further, the timer 11 starts counting the protection time Ts (Step #55).

During the charging operation, the charge voltage Ve of the main capacitor $C_M$ is detected by the second voltage detecting circuit 93 (Step #60). When the detected voltage Ve increases to a predetermined charge voltage Vc (e.g., 280 V) (NO in Step #65) before a count value T of the timer 11 reaches the protection time Ts (YES in Step #70), the output of the drive control signal Fc is stopped and charging is stopped (Step #75). On the other hand, if the count value T of the timer 11 reaches the protection time Ts (NO in Step #70) before the detected voltage Ve increases to the predetermined charge voltage Vc (YES in Step #65), a charging abnormality is judged to have occurred and the output of the drive control signal Fc is forcibly stopped by inverting the level of the charge stop signal STC to low level, thereby stopping the charging operation (Step #75).

Since the protection time Ts is inversely proportional to the level of the battery voltage Vp, i.e., is shortened as the level of the battery voltage Vp increases as described above, excessive charging is not to the extent that it causes a problem even in the case of high speed charging, and protection against excessive charging can be properly effected independently of the battery voltage Vp. Accordingly, a capacitor having as low a withstand voltage as possible can be used as the main capacitor $C_M$ and therefore the electronic flash 7 can be made smaller.

FIG. 5 is a flowchart showing a second charging control of the main capacitor $C_M$ of the electronic flash 7. Although the protection time Ts is set in accordance with the battery voltage Vp in the first charging control, it is set in accordance with both the battery voltage Vp and an initial voltage Ve0 of the main capacitor $C_M$ at the start of charging.

The flowchart of FIG. 5 differs from that of FIG. 4 in that a processing for detecting the initial voltage Ve0 of the main capacitor $C_M$ at the start of charging (Step #11) is inserted between Steps #10 and #15 and that the processing of Steps #15 to #45 is replaced by a processing for setting the protection time Ts based on the battery voltage Vp and the voltage Ve of the main capacitor $C_M$ (Step #46).

In the flowchart of FIG. 5, when a boost command signal is inputted from the microcomputer of the camera 1 (YES in Step 5), the battery voltage Vp is detected by the first voltage detecting circuit 91 (Step #10) and the initial voltage Ve0 of the main capacitor $C_M$ is detected by the second voltage detecting circuit (Step #11). The protection time Ts is set based on the detected voltages Vp, Ve0 (Step #46).

In the electronic flash 7 of the camera 1 having a power battery of 6 V, the protection time Ts is set as defined in TABLE-2 below. In this case as well, different protection times Ts are stored in the memory 101 in correspondence with the battery voltage Vp and the capacitor voltage Ve. The controller 10 reads the protection time Ts corresponding to both detected voltages Vp and Ve from the memory 101, and sets it in the timer 11.

TABLE 2

| | Ts (sec) | | |
|---|---|---|---|
| Vp (V) | Ve0 ≦ 200 | 200 < Ve0 ≦ 240 | 240 < Ve0 |
| Vp ≦ 4.4 | * | * | * |
| 4.4 < Vp ≦ 5.0 | 12 | 5.6 | 3 |
| 5.0 < Vp ≦ 6.0 | 5 | 2.4 | 1.4 |
| 6.0 < Vp | 3 | 1.6 | 0.8 |

Note)
*denotes that a shutter release is prohibited.

As shown in TABLE-2, when both the battery voltage Vp and the initial voltage Ve0 of the main capacitor $C_M$ are considered, a protection time Ts more suited to the charging conditions can be set.

In the first and second charging controls, a plurality of protection times Ts are stored in the memory 101 in advance, and the protection time Ts corresponding to the detected battery voltage (and the initial voltage Ve0 of the main capacitor $C_M$) is read from the memory 101. However, the protection time Ts may be calculated based on the detected battery voltage (and the initial voltage Ve0 of the main capacitor $C_M$).

FIG. 6 is a flowchart showing a third charging control of the main capacitor $C_M$ of the electronic flash 7 in which the protection time Ts is calculated. The flowchart of FIG. 6 differs from that of FIG. 5 in that the processing of Step #11 is replaced by a processing for calculating a charging completion time Tg1 (Step #12) and that the processing of Step #46 is replaced by a processing for calculating and setting the protection time Ts based on the charge completion time Tg1 (Step #47).

In the flowchart of FIG. 6, in the case that the protection time Ts is calculated, e.g., based on the battery voltage Vp, a time Tg0 required for the completion of the charging (presumed time) is calculated based on the detected voltage Vp in Step #12. The protection time Ts is calculated by multiplying this time Tg0 by a predetermined coefficient k0 or adding a predetermined time $\Delta$ T0 thereto (Ts=k0·Tg0 or Tg0+$\Delta$ T0). In the case that both the battery voltage Vp and the initial voltage Ve0 of the main capacitor $C_M$ are considered, the protection time Ts can be calculated in a similar manner. More specifically, a time Tgn required for the completion of the charging (presumed time) is calculated based on the detected voltage Vp and the initial voltage Ve0, and the protection time Ts is calculated by multiplying this time Tgn by a predetermined coefficient kn or adding a predetermined time $\Delta$ Tn thereto (Ts=kn·Tgn or Tgn+$\Delta$ Tn).

In the third charging control, since it is not necessary to store a plurality of protection times Ts in the memory 101, the construction of the electronic flash 7 can be made simpler.

Figure 7:
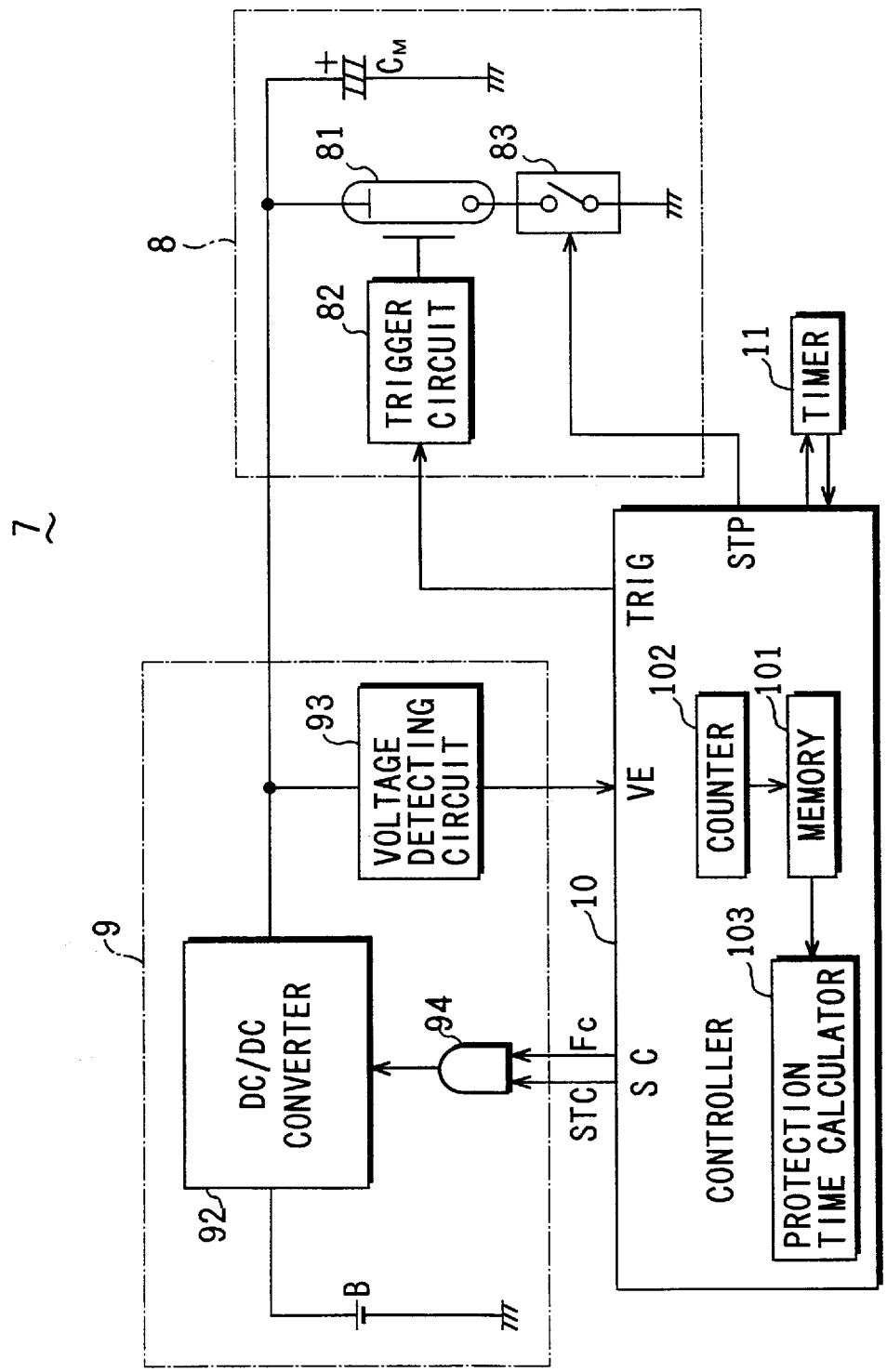
FIG. 7 is a diagram showing a circuit construction of a second electronic flash provided in the camera.

FIG. 7 is a circuit construction diagram of a second electronic flash 7 provided in the camera 1.

The second electronic flash 7 is designed to calculate the protection time Ts for a current charging operation using a charging time (time required for charging) in a previous charging operation. Accordingly, the circuit construction diagram of FIG. 7 differs from that of FIG. 2 in that the first voltage detecting circuit 91 is omitted and that a counter 102 for counting a charging time Tg and a protection time calculator 103 for calculating the protection time Ts are additionally provided in the controller 10.

Figure 8:
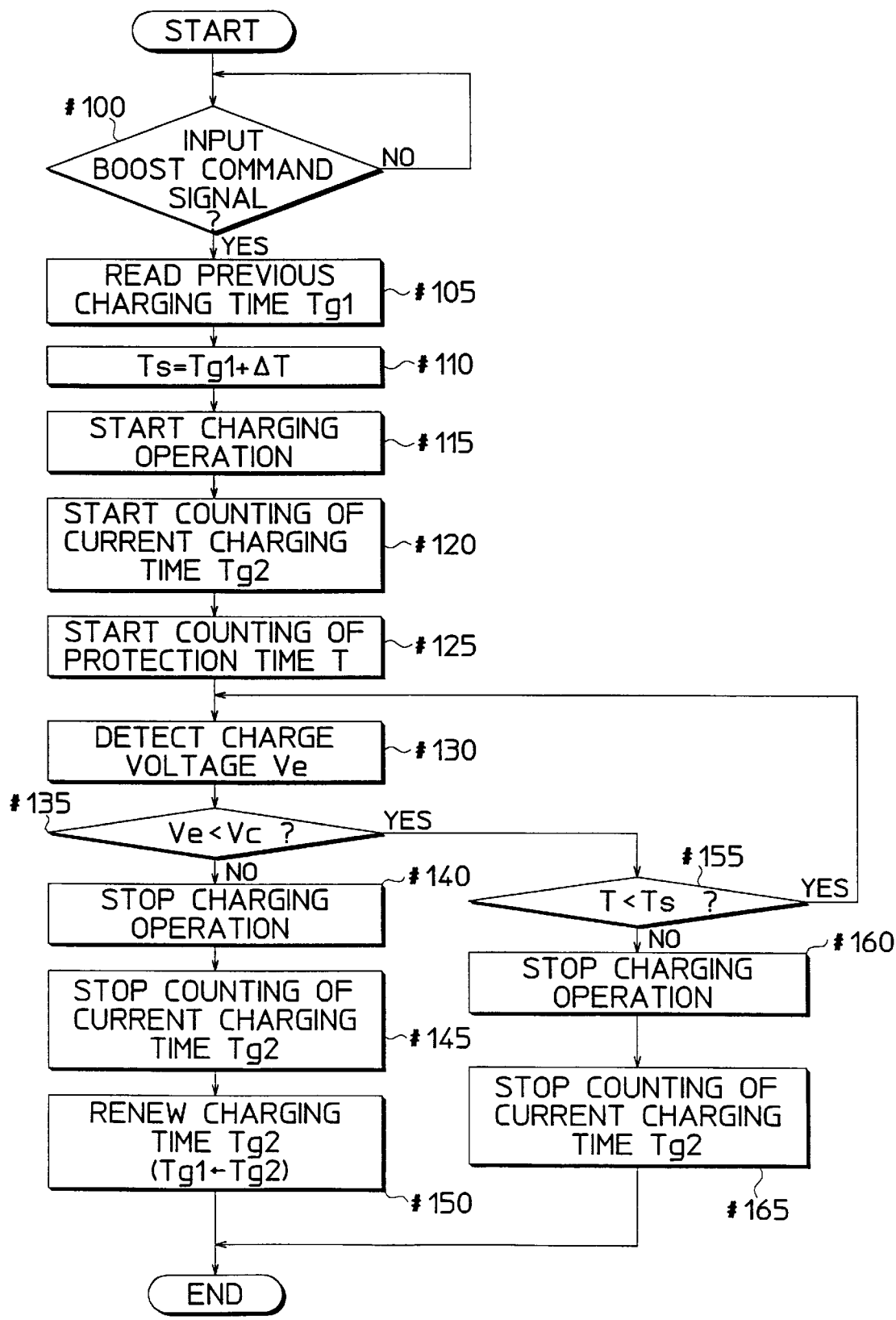
FIG. 8 is a flowchart showing a first charging control of a main capacitor $C_M$ of the second electronic flash.
Figure 9:
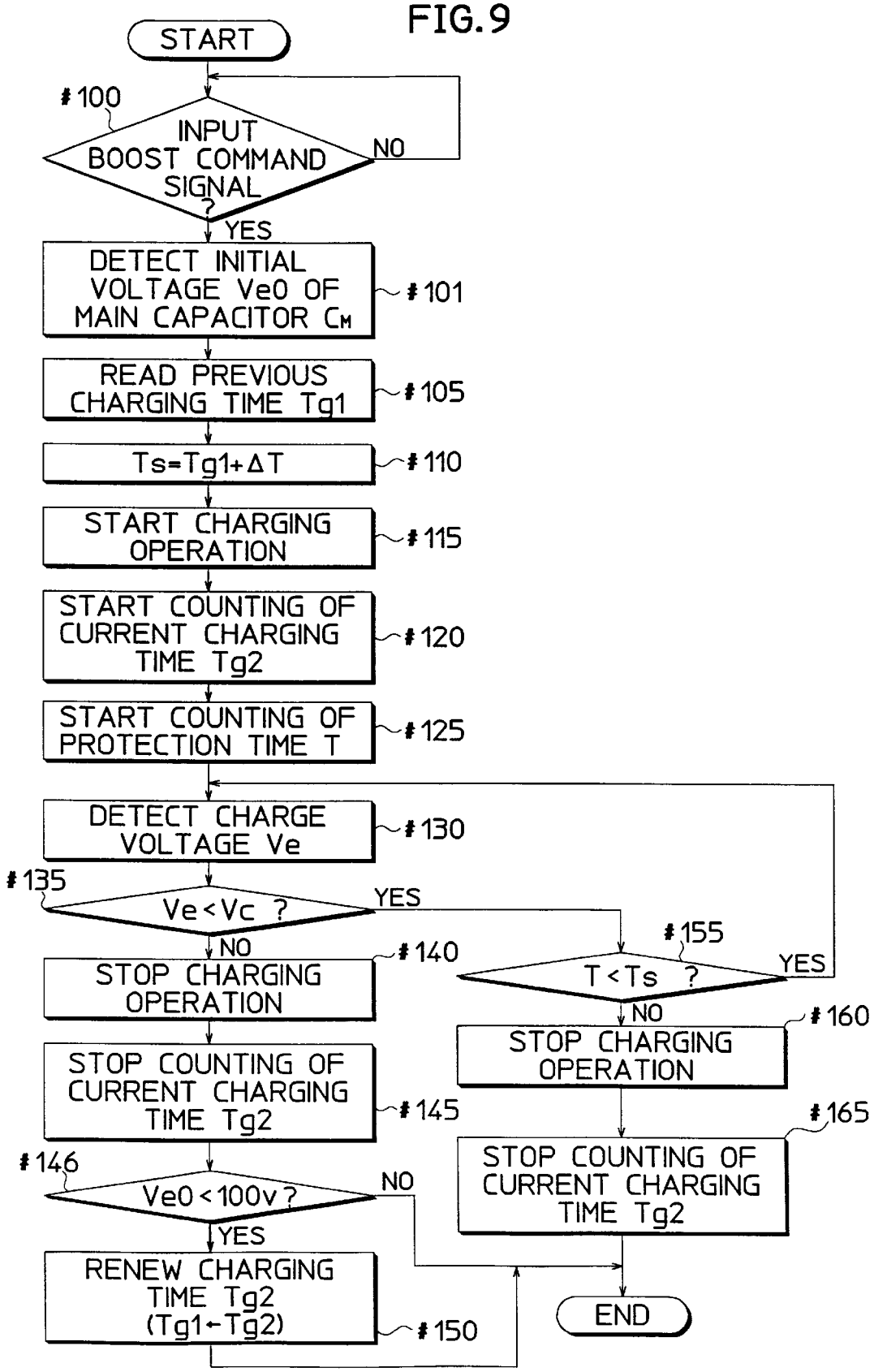
FIG. 9 is a flowchart showing a second charging control of the main capacitor $C_M$ of the second electronic flash.
Figure 10:
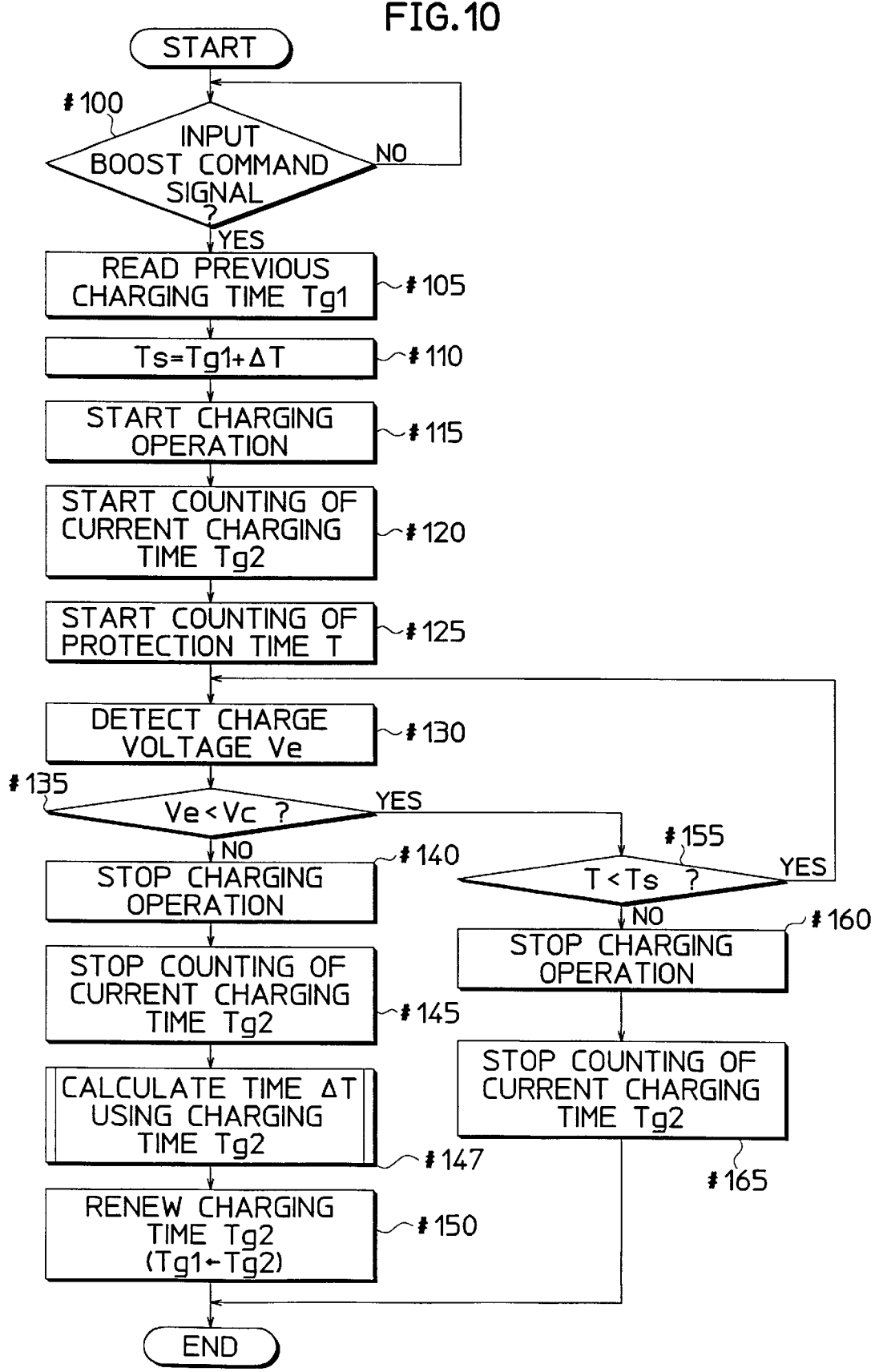
FIG. 10 is a flowchart showing a third charging control of the main capacitor $C_M$ of the second electronic flash.

A charging control of the controller 10 for the main capacitor $C_M$ is described in accordance with flowcharts shown in FIGS. 8 to 10.

FIG. 8 is a flowchart showing a first charging control of the main capacitor $C_M$ of the second electronic flash 7.

When a boost command signal is inputted from the microcomputer of the camera 1 (YES in Step #100), a charging time Tg1 in the previous charging operation is read from the memory (Step #105). In the case of charging for the first time, an initial value set in advance in the memory 101 is read.

Subsequently, the protection time Ts (=Tg1+$\Delta$ T) is calculated by adding a predetermined time $\Delta$ T to the read charging time Tg1 (Step #110), thereby starting the charging operation (Step #115). For example, in the case of the electronic flash 7 of the camera 1 including a power battery of 6V, $\Delta$ T=4.0 (sec) and the protection time Ts is calculated: Ts=Tg1+4.0 (sec). In this embodiment, the time $\Delta$ T is stored in advance in the memory 101.

Subsequently, the counting of a charging time Tg2 of a current charging operation by the counter 102 is started (Step #115) and the counting of the protection time T by the timer 11 is started (Step #120).

During the charging operation, the charge voltage Ve of the main capacitor $C_M$ is detected by the second voltage detecting circuit 93 (Step #130). If the detected voltage Ve increases to a predetermined charge voltage Vc (e.g., 280V) (NO in Step #135) before a count value T of the timer 11 reaches the protection time Ts (YES in Step #155), the output of the drive control signal Fc is stopped to stop the charging operation (Step #140), and the counting by the counter 102 is stopped to count a charging time Tg2 for the current charging operation (Step #145). The charging time Tg2 is renewably stored in the memory 101 (Step #150), completing the charging operation.

On the other hand, if the count value T of the timer 11 reaches the protection time Ts (NO in step #155) before the detected voltage Ve increases to the charging voltage Vc (YES in Step #135), the level of the charge stop signal STC is inverted to low level upon the judgment that an abnormality has occurred during the charging operation, thereby forcibly stopping the output of the drive control signal Fc to stop the charging operation (Step #165). In such a case, since the charging operation is forcibly stopped and, accordingly, an accurate charging time Tg2 is not measured, the charging operation is completed without renewing the charging time Tg2 in the memory 101. Therefore, the charging time Tg1 in the previous charging time is still kept in the memory 101.

FIG. 9 is a flowchart showing a second charging control of the main capacitor $C_M$ of the second electronic flash 7.

In the charging control of FIG. 8, the protection time Ts is calculated by adding the fixed time $\Delta$ T. In the case of charging the main capacitor $C_M$ which has not completely been discharged, since the measured charging time Tg1 is very short, there is a likelihood that the obtained protection time Ts is not sufficient for a next charging operation. Thus, with the fixed time $\Delta$ T, it is desirable to renewably store, in the memory 101, only charging time Tg1 obtained during the charging control when the main capacitor $C_M$ is completely discharged and not to renew the content of the memory 101 unless otherwise.

The charging control of FIG. 9 is designed to discriminate a discharged state of the main capacitor $C_M$ from the initial voltage Ve0 and to control the recording of the charging time Tg in the memory 101 based on the discrimination result. Accordingly, the flowchart of FIG. 9 differs from that of FIG. 8 in that a processing for detecting the initial voltage Ve0 of the main capacitor $C_M$ at the start of charging (Step #101) is inserted between Steps #100 and #105 and that a processing for discriminating whether the voltage of the main capacitor $C_M$ after the charging is above a predetermined threshold voltage (100V in this embodiment) (Step #146) is inserted between Steps #145 and #150.

In the flowchart of FIG. 9, when the charging operation is normally performed without being forcibly stopped and the charging time Tg2 of this current charging operation is measured by the counter 102 (Step #145), it is discriminated whether the initial voltage Ve0 of the main capacitor $C_M$ is below 100V (Step #146). If Ve0<100V (YES in Step #146), the measured charging time Tg2 is renewably stored in the memory 101 upon the judgment that charging is performed to the main capacitor $C_M$ which was not completely discharged (Step #150), thereby completing the charging operation. If Ve0$\geq$100V (NO in Step #146), the charging operation is completed without storing the measured charging time Tg2 in the memory 101 upon the judgment that charging is performed to the main capacitor $C_M$ which was completely discharged.

FIG. 10 is a flowchart showing a third charging control of the main capacitor $C_M$ of the second electronic flash 7.

In the charging control of FIG. 10, the time $\Delta$ T is made variable and a suitable protection time Ts is constantly obtained by adding a suitable time $\Delta$ T to the measured charging time Tg. Accordingly, the flowchart of FIG. 10 differs from that of FIG. 8 in that a processing for calculating the time $\Delta$ T using a measured charging time Tg2 (Step #147) is inserted between Steps #145 and #150.

In the flowchart of FIG. 10, when the current charging operation is properly performed without being forcibly stopped and the charging time Tg2 in this current charging operation is measured by the counter 102 (Step #145), the time Δ T is calculated using this charging time Tg2 and is renewably stored in the memory 101 (Step #146). The measured charging time Tg2 is renewably stored in the memory 101 (Step #150), and then the charging operation is completed. It should be noted that the time Δ T can be calculated by an empirically defined operational expression.

Since the third charging control can constantly renew the content of the memory 101 by the measured charging time Tg2 without discriminating whether or not the content of the memory 101 should be renewed based on the discharged state of the main capacitor $C_M$, the processing can be simpler than that of the second charging control.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A device comprising:
    a booster which boosts the voltage of electric energy from a power source;
    a capacitor which stores the boosted electric energy;
    a light emitter which emits flash light by use of the stored electric energy;
    a detector which detects a voltage of the power source when a charging of the capacitor is started;
    a timer which measures an elapsed time from the start of the charging;
    a memory which stores a relationship between a plurality of control times and a plurality of respective voltages of the power source; and
    a controller which sets a control time based on a detected voltage and the stored relationship, and controls a termination of the charging in accordance with the set control time and measurement of the timer.

2. A device according to claim 1, wherein smaller control times correspond to greater voltages.

3. A device according to claim 1, which is an electronic flash.

4. A device according to claim 1, which is a camera provided with an electronic flash.

5. A device comprising:
    a booster which boosts the voltage of electric energy from a power source;
    a capacitor which stores the boosted electric energy;
    a light emitter which emits flash light by use of the stored electric energy;
    a detector which detects a voltage of the power source when a charging of the capacitor is started;
    a timer which measures an elapsed time from the start of the charging;
    a calculator which calculates a control time based on a detected voltage of the power source detected by the detector; and
    a controller which controls termination of the charging in accordance with the calculated control time and measurement of the timer.

6. A device according to claim 5, wherein the calculator calculates smaller control times with respect to greater voltages.

7. A device according to claim 5, which is an electronic flash.

8. A device according to claim 5, which is a camera provided with an electronic flash.

9. A device comprising:
    a booster which boosts the voltage of electric energy from a power source;
    a capacitor which stores the boosted electric energy;
    a light emitter which emits flash light by use of the stored electric energy;
    a capacitor voltage detector which detects a voltage of the capacitor when a charging of the capacitor is started;
    a timer which measures an elapsed time from the start of the charging;
    a calculator which calculates a control time based on a detected capacitor voltage; and
    a controller which controls termination of the charging in accordance with the calculated control time and measurement of the timer.

10. A device according to claim 9, further comprising a power source voltage detector which detects a voltage of the power source when the charging is started, wherein the calculator calculates a control time based on both a detected capacitor voltage and a detected power source voltage.

11. A device according to claim 9, which is an electronic flash.

12. A device according to claim 9, which is a camera provided with an electronic flash.

13. A device comprising:
    a booster which boosts the voltage of electric energy from a power source;
    a capacitor which stores the boosted electric energy;
    a light emitter which emits flash light by use of the stored electric energy;
    a first time measurer which measures a charging time of the capacitor to produce a measured charging time from start of a specified charging to completion of the specified charging;
    a memory which stores the measured charging time;
    a second time measurer which measures an elapsed time from the start of a charging; and
    a controller which controls termination of a charging following the specified charging in accordance with the stored charging time and measurement of the second time measurer.

14. A device according to claim 13, wherein, when a prescribed criterion is met, the controller prohibits storing of a measured charging time in the memory.

15. A device according to claim 13, which is an electronic flash.

16. A device according to claim 13, which is a camera provided with an electronic flash.

17. A device according to claim 14, wherein the prescribed criterion is that an initial voltage of the capacitor is above a particular value.

18. A device according to claim 14, wherein the controller controls termination of the charging following the specified charging in accordance with the stored charging time, a prescribed incremental time value, and measurement of the second time measurer.

19. A device according to claim 14, wherein the prescribed incremental time value is calculated using the stored charging time.

20. A method for charging a capacitor connected to an electronic flash, comprising the steps of:

receiving a boost command signal;

starting a charging operation to charge the capacitor in response to the boost command signal;

determining whether a time spent charging exceeds a protection time interval, and if so, stopping the charging operation;

determining whether a voltage of the capacitor exceeds a predetermined voltage, and if so, stopping the charging operation;

wherein the protection time interval is selected according to one of the following series of substeps:
 a) determining the protection time interval by:
  i) detecting a battery voltage when the charging of the capacitor is started;
  ii) selecting the protection time interval from a memory storing values corresponding to the detected battery voltage;
 b) determining the protection time interval by:
  i) detecting a battery voltage when the charging of the capacitor is started;
  ii) calculating the protection time interval on the basis of the detected battery voltage;
 c) determining the protection time interval by:
  i) detecting an initial voltage of the capacitor;
  ii) calculating the protection time interval on the basis of at least the detected initial voltage of the capacitor; and
 d) determining the protection time interval by:
  i) storing a charging time from the start of a previous charging of the capacitor to an end of the previous charging;
  ii) using the stored charging time to calculate the protection time interval.

* * * * *